(12) United States Patent
Winstead et al.

(10) Patent No.: US 9,864,053 B2
(45) Date of Patent: Jan. 9, 2018

(54) SYSTEMS AND METHODS FOR USING VELOCITY MEASUREMENTS TO ADJUST DOPPLER FILTER BANDWIDTH

(71) Applicant: Honeywell International Inc., Morristown, NJ (US)

(72) Inventors: Benjamin J. Winstead, Minneapolis, MN (US); Timothy J. Reilly, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 508 days.

(21) Appl. No.: 14/613,888

(22) Filed: Feb. 4, 2015

(65) Prior Publication Data
US 2017/0350971 A1  Dec. 7, 2017

(51) Int. Cl.
| | | |
|---|---|---|
| *G01S 13/02* | (2006.01) | |
| *G01S 13/58* | (2006.01) | |
| *G01S 13/18* | (2006.01) | |
| *G01S 13/60* | (2006.01) | |
| *G01S 13/88* | (2006.01) | |
| G01S 7/285 | (2006.01) | |
| G01S 13/87 | (2006.01) | |

(52) U.S. Cl.
CPC ............ *G01S 13/582* (2013.01); *G01S 13/18* (2013.01); *G01S 13/585* (2013.01); *G01S 13/605* (2013.01); *G01S 13/882* (2013.01); *G01S 7/285* (2013.01); *G01S 13/87* (2013.01)

(58) Field of Classification Search
CPC .................................. G01S 13/02; G01S 13/89
USPC .......................................................... 342/22
See application file for complete search history.

(56) References Cited

U.S. PATENT DOCUMENTS

| | | |
|---|---|---|
| 3,996,589 A | 12/1976 | Breese |
| 4,594,676 A | 6/1986 | Breiholz et al. |
| 5,736,957 A | 4/1998 | Raney |
| 7,248,208 B2 | 7/2007 | Hager et al. |
| 7,911,375 B2 | 3/2011 | Winstead et al. |
| 2003/0102999 A1 | 6/2003 | Bergin et al. |
| 2004/0252048 A1 | 12/2004 | Hager et al. |

(Continued)

OTHER PUBLICATIONS

European Patent Office, "Extended European Search Report from EP Application No. 16153545.5 dated Jun. 14, 2016", "from Foreign Counterpart of U.S. Appl. No. 14/613,888", Jun. 14, 2016, pp. 1-8, Published in: EP.

(Continued)

*Primary Examiner* — Timothy A Brainard
(74) *Attorney, Agent, or Firm* — Fogg & Powers LLC

(57) ABSTRACT

Systems and methods for using velocity measurements to adjust Doppler filter bandwidth are provided herein. In certain embodiments, a method for adjusting bandwidth for at least one Doppler filter in a Doppler beam sharpened radar altimeter comprises receiving a velocity measurement; adjusting the bandwidth of the at least one Doppler filter based on the velocity measurement; and transmitting a radar beam, wherein the radar beam is aimed toward a surface. The method further comprises receiving at least one reflected signal, wherein the at least one reflected signal is a reflection of the radar beam being reflected off of at least one portion of the surface; and filtering the at least one reflected signal with the at least one Doppler filter to form at least one Doppler beam.

20 Claims, 8 Drawing Sheets

(56) References Cited

U.S. PATENT DOCUMENTS

| | | |
|---|---|---|
| 2006/0044182 A1 | 3/2006 | Vacanti |
| 2007/0273572 A1 | 11/2007 | Thomas et al. |
| 2008/0246648 A1 | 10/2008 | Winstead et al. |
| 2016/0139257 A1* | 5/2016 | Yamashina ........... G01S 13/584 342/109 |

OTHER PUBLICATIONS

Choi et al, "A new Approach of FMCW-DBS Altimeters for Terrain-aided Navigation", "IEICE", Sep. 23, 2013, pp. 214-217, Publisher: 2013 Asia-Pacific Conference on Synthetic Aperture Radar (APSAR).
Winstead, "Systems and Methods for Measuring Velocity With a Radar Altimeter", "U.S. Appl. No. 14/613,879, filed Feb. 4, 2015", pp. 1-38, Published in: US.
European Patent Office, "Communication Pursuant to Article 94(3) for EP Application No. 16153545.5", "Foreign Counterpart to U.S. Appl. No. 14/613,888", dated Aug. 22, 2017, pp. 1-4, Published in: EP.

* cited by examiner

SYSTEMS AND METHODS FOR USING VELOCITY MEASUREMENTS TO ADJUST DOPPLER FILTER BANDWIDTH

BACKGROUND

Aircraft navigation systems frequently use velocity information calculated by different sensors onboard an aircraft to provide a navigation solution representing the location and attitude of the aircraft. For example, global positioning systems (GPS) are common sources of velocity measurements used in providing a navigation solution. Other sources of velocity measurements include measurements from an aircraft's inertial navigation system and airspeed measurements from observations of relative air pressure through a pitot tube. However, these different sources of velocity measurements are subject to different errors that increase the challenge of gathering reliable measurements of ground speed. In certain situations, a GPS may be easily jammed, causing the aircraft to rely on other less reliable sources of velocity measurement. For example, measurements from an inertial navigation system slowly drift over time and airspeed measurements via a pitot tube fail to provide accurate information about an aircraft's ground speed.

Further, in certain embodiments, a Doppler beam sharpened radar altimeter may use Doppler filters to form the Doppler beams. However, the bandwidth and power needed to form the different Doppler filters is based on the maximum speed of the aircraft. Because, the bandwidth of the Doppler filters are based on the maximum speed, the Doppler filters consume unnecessary power and resources.

SUMMARY

Systems and methods for using velocity measurements to adjust Doppler filter bandwidth are provided herein. In certain embodiments, a method for adjusting bandwidth for at least one Doppler filter in a Doppler beam sharpened radar altimeter comprises receiving a velocity measurement; adjusting the bandwidth of the at least one Doppler filter based on the velocity measurement; and transmitting a radar beam, wherein the radar beam is aimed toward a surface. The method further comprises receiving at least one reflected signal, wherein the at least one reflected signal is a reflection of the radar beam being reflected off of at least one portion of the surface; and filtering the at least one reflected signal with the at least one Doppler filter to form at least one Doppler beam.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
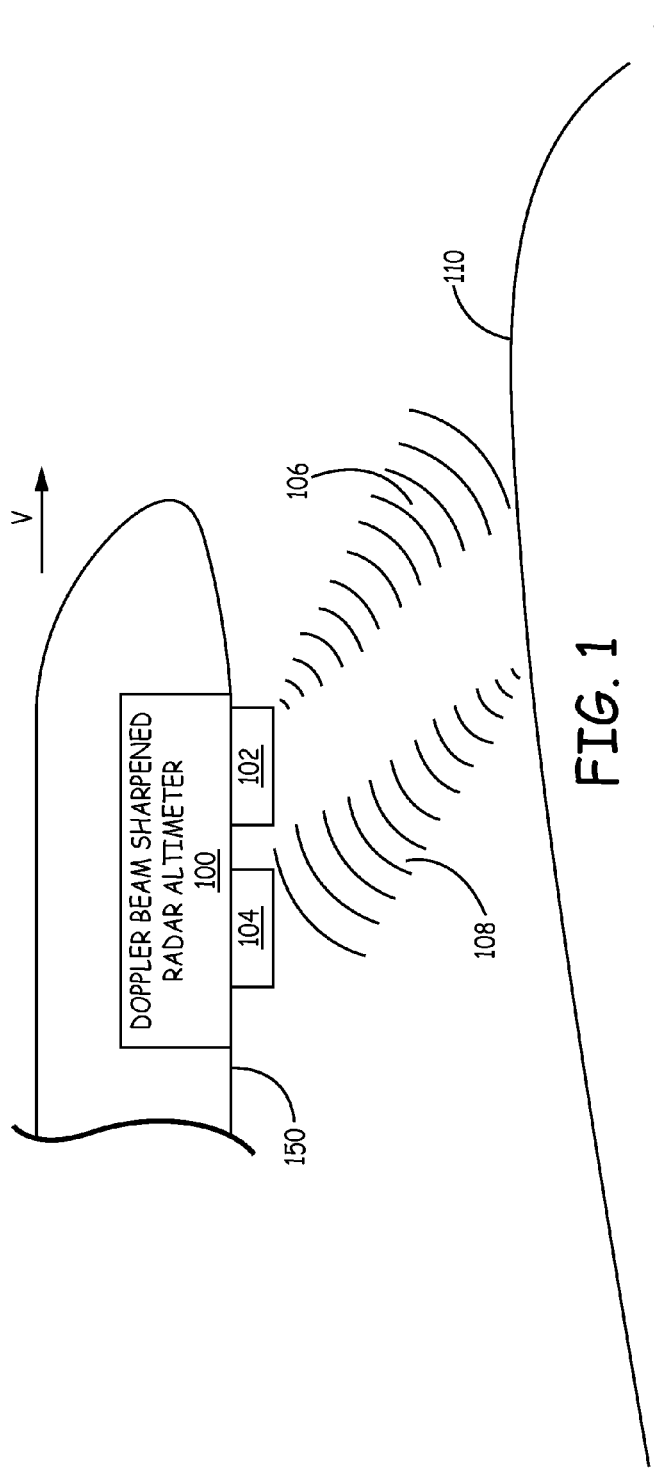
FIG. 1 is a block diagram illustrating an aircraft equipped with a radar altimeter in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments described within the present disclosure provide systems and methods for measuring velocity through the use of a radar altimeter. To measure the velocity using a radar altimeter, the radar altimeter creates two or more Doppler beams at different Doppler frequencies. The radar altimeter then may apply a tracking algorithm to each of the beams to produce at least two independent altitude tracks. The range measurements produced by the different altitude tracks will be offset from one another and the magnitude of the range will be dependent on the velocity of the aircraft in relation to the measured terrain. Using trigonometric functions, the calculations based on the range differences between the different tracks can be used to determine the velocity of the aircraft in relation to the ground. The determined velocity can then be used by the aircraft as another velocity measurement to improve the accuracy of navigation solutions calculated by the aircraft, particularly when the aircraft is operating in a GPS denied environment. Also, as described in greater detail below, the velocity measurement produced by the radar altimeter may be used to improve the performance of the radar altimeter.

FIG. 1 is a block diagram of one embodiment of an aircraft 150 equipped with a Doppler beam sharpened radar altimeter 100. The term aircraft, as used herein, refers to an airplane, a helicopter, or the like. As illustrated in FIG. 1, the aircraft 150 flies in a direction having a velocity vector v. As described herein, the aircraft 150 uses a Doppler beam sharpened radar altimeter 100 to gather information about the environment through which the aircraft 150 travels. Other systems may also use a Doppler beam sharpened radar altimeter 100, such as cruise missiles, satellites, or other aerial system able to calculate altitude. In certain implementations, the system containing the Doppler beam sharpened radar altimeter 100 may also be referred to as a platform.

Systems and embodiments for a Doppler beam sharpened radar altimeter 100 are described in further detail in U.S. Pat. No. 7,911,375, entitled "DOPPLER BEAM-SHARPENED RADAR ALTIMETER" filed on Jun. 3, 2009, herein incorporated in its entirety by reference and referred to herein as the '375 patent.

The radar altimeter 100 comprises a transmitter 102 and a receiver 104. The transmitter 102 transmits signals 106 (for example, pulsed radar signals) towards a target 110. The target 110 can be terrain or any other detectable object. The receiver 104 receives or detects return signals 108 reflected from the target 110. Due to the aircraft 150 flying with velocity v, the return signals 108 will be Doppler shifted. As the aircraft 150 flies towards the target 110, the return signals 108 are Doppler shifted to be higher in frequency than the signals 106. As the aircraft 150 flies away from the target 110, the return signals 108 are Doppler shifted lower in frequency. The maximum Doppler shift occurs along the line of flight of the aircraft 150. For targets perpendicular to the direction of motion of the aircraft 150, there is zero Doppler shift because there is no relative velocity between the perpendicular target and the aircraft 150.

In certain embodiments, the radar altimeter 100 may break down the Doppler spectrum of the return signal 108 into a plurality of smaller sub-spectrums (referred to herein as frequency bins or bins). A bin corresponds to a bounded frequency range within the spectrum of the returned signal. Each frequency bin corresponds to a different range of Doppler shift frequencies (in other words, each bin is centered on a different Doppler shift frequency). To be detectable, signals near the extremities of a filter's bandwidth may be stronger than signals with frequencies close to the center point. Because the frequency bins are also subject to this same limitation, the frequency ranges of the bins may be designed to overlap with the frequency ranges of adjacent frequency bins, such that signals received at the different frequencies of the spectrum are detectable. Each frequency bin can provide enough overlap with adjacent frequency bins to provide coverage of the different Doppler frequencies of signals reflected by target 110 and received by receiver 104. One embodiment overlaps the frequency bins by 50%, so that each frequency is covered by two bins (except for the ends of the Doppler spectrum). At an end of the Doppler spectrum, a frequency bin may be overlapped by another frequency bin that encompasses frequencies outside the Doppler spectrum. On any given frequency segment there could potentially be redundant information, but this does not effect how much signal can be picked up. Other amounts of overlap are contemplated, such as 0% overlap up to 80% overlap, or bins that overlap more than the adjacent bins.

In at least one implementation, the range of the spectrum covered by the Doppler bins is determined by the velocity v of the aircraft 150. For example, the maximum magnitude of the Doppler shift occurs when the receiver 104 receives a signal reflected from a target 110 where the signal is reflected along a path that is parallel to the direction of the velocity vector v either in front of or behind the aircraft 150. The maximum magnitude of the Doppler shift is dependent on the magnitude of the velocity vector. For example, if the aircraft 150 is traveling at a high speed, the maximum Doppler shift will be greater than if the aircraft 150 is traveling at a low speed. In certain implementations, the frequency assigned to the highest bin or the bandwidth of a single filter that encompasses the possible range of Doppler shifts is based on the maximum designed velocity of the aircraft 150. However, when the aircraft is moving slower than the maximum designed velocity, there will be a number of bins within the Doppler spectrum that are unused, yet still consuming computing resources. In certain implementations, to improve the performance of the radar altimeter 100, the radar altimeter 100 may adjust the frequencies of the bins of the Doppler spectrum based on the velocity of the aircraft 150. For example, as the aircraft 150 travels less than the maximum designed velocity, the radar altimeter 100 adjusts the range of the Doppler spectrum, so that the edges of the maximum Doppler shift represented within the Doppler spectrum corresponds to the current velocity of the aircraft. In at least one implementation, the different velocities are provided by other velocity sensors located on the aircraft 150. For example, the ground velocity measurements may be provided by a GPS, an inertial navigation system, and the like. Also, in at least one implementation, the air speed, provided by a pitot tube, may also be used to provide a velocity measurement.

In certain embodiments, the radar altimeter 100 may produce the velocity measurement for determining the range of the Doppler spectrum and provide a velocity measurement to other systems on the aircraft 150. In certain embodiments, to produce a measurement of velocity v, the radar altimeter 100 acquires measurements from at least two separate Doppler radar tracks. Each different radar track provides a measurement of the range toward target 110 at a different angle from the aircraft 150. The radar altimeter 100 uses the computed ranges and the associated Doppler frequency offsets associated with the different computed ranges to calculate the velocity of the aircraft.

Figure 2:
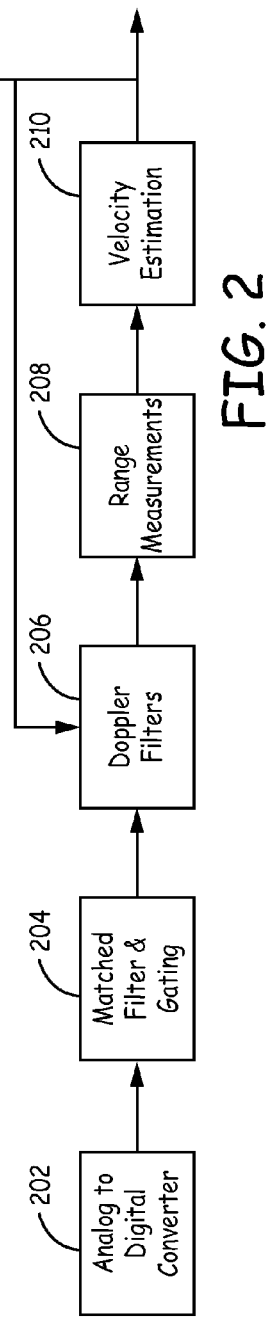
FIG. 2 is a block diagram illustrating a receiver for a radar altimeter that produces velocity estimates in one embodiment described in the present disclosure.

FIG. 2 is a high level block diagram of an embodiment of a receiver 200 for a Doppler beam sharpened radar altimeter system for providing velocity information. The receiver 200 may include an analog to digital converter (ADC) 202. The ADC 202 and the receiver 200, like receiver 104 in FIG. 1, receives reflected radar signals downconverts the received signals to baseband and an intermediate frequency, and converts the downconverted signals into digital signals for digital processing by a processor. The processor may be any type of processing unit that is capable of executing computer instructions that direct the processor to perform specific tasks on the received data. In at least one embodiment, the processor may be a digital signal processor. In a further embodiment, receiver 200 may also include a matched filter and gating 204. The matched filter and gating 204 may be used to measure the reflected energy within a prescribed time period. For example, the matched filter and gating 204 may gate the signals for further processing by selecting a certain time range of samples for analysis. Each gate in the matched filter and gating 204 is considered to represent a window of time in which the system monitors the reflected energy of the received signal (that is, the radar altimeter begins to accumulate energy at the beginning of each gate and stops accumulating this energy at the end of each gate). In certain implementations, the width of a gate (that is, width in time) is typically set to be equal to the transmit pulse width, but can be longer or shorter. For example, gate widths are generally dependent on the transmit pulse width in that as the transmit pulse width is increased the track and gate widths are also increased. Gating is not to be confused with windowing, which is discussed below.

In certain implementations, each separate Doppler channel comprises a different gate. However, a single gate may be used for each Doppler channel. When different gates are used for the different Doppler channels, the different channels may have different gate positions or gate widths. In at least one implementation, one of the Doppler channels may function as a level channel that is used to determine if a return signal's level is large enough to be considered a valid target.

Further, the receiver 200 may include Doppler filters 206. The Doppler filters 206 are used to form the multiple Doppler beams by filtering the reflected and received digital signals at different frequencies having a Doppler shift with a magnitude less than the magnitude of the largest possible Doppler frequency shift. In one implementation, the magnitude of the largest Doppler frequency shift occurs when the signal is reflected by a surface either directly in front of or behind the aircraft along the velocity vector of the platform. Each Doppler filter in the Doppler filters 206 is associated with a different Doppler beam. In at least one implementation, to form the different Doppler beams, a fast Fourier transform (FFT) separates the received signal into one or more frequency bins. In one implementation, a single FFT separates the received signal for each different Doppler filter In at least one embodiment, the Doppler filters 206 may use windowing schemes that are applied to the FFTs. Windowing is a digital signal processing (DSP) technique typically used to reduce the sensitivity of one FFT bin to signals present in other (usually undesired) FFT bins. Windowing also reduces the scalloping loss that occurs when the frequency of a signal of interest lies half-way between the center frequencies of two adjacent bins. Windowing widens the response of each of the FFT frequency bins but does not change their spacing. Different windowing schemes increase the bandwidth of the frequency bins by different amounts with varying effects on any given bin's response to signals outside that bin. Windowing schemes that can be used include but are not limited to a Hamming window, Hann window, and Blackman window. The window that is selected may affect scalloping loss. Also, zero-padding the samples before performing the FFT may increase the resolution of the FFT in the frequency domain.

Advantages of applying an FFT and a windowing scheme includes that the narrower bandwidth of each frequency bin reduces the detected noise present at the signal acquisition logic. In one alternative embodiment, a bank of band pass filters may separate the return signal into the frequency bins in place of the FFTs. Each individual band pass filter is focused on a different frequency of the Doppler spectrum. These band pass filters may overlap each other in a similar manner as the frequency bins from FFTs.

Further, receiver 200 may include range measurements 208. When performing range measurements 208, the receiver 200 may identify the different range measurements from the different Doppler beams. As one having skill in the art may appreciate, range measurements 208 identifies the range to the targets within each of the various Doppler beams by calculating the elapsed time between transmission of a signal and the reception of the received signal and multiplying the velocity of the signal by the elapsed time. Each Doppler beam is associated with a location on the reflective surface, which the aircraft is traveling towards (or away from) at a different velocity than other locations on the reflective surface. For example, when the aircraft is travelling parallel to the ground, the magnitude of the aircraft's velocity directly towards the ground beneath the aircraft is zero, resulting in a Doppler shift of zero. Also, the magnitude of the velocity of the aircraft towards other locations on the ground that are not directly below the aircraft are between zero and the magnitude of the aircraft's velocity. Due to the difference in velocity, each reflected signal that is reflected from a particular location will have a different Doppler shift than a reflected signal that is reflected from other locations. Thus, a Doppler filter effectively forms a Doppler beam in the direction in which the reflections are shifted by that Doppler Frequency. The range measurements 208 calculates the range for each of the different Doppler beams based on the frequency and time of reception of a received signal in each Doppler filter.

In at least some implementations, the receiver 200 also includes velocity estimation 210. Velocity estimation 210 calculates the velocity of the aircraft from the range measurements calculated from multiple Doppler beams over time. To calculate the velocity, velocity estimation 210 first buffers a series of range and Doppler beams verses time for the different Doppler beams. As the receiver 200 has identified the range to the terrain within each of the Doppler beams, the velocity estimation 210 is then able to calculate the magnitude of the aircraft velocity. In particular, velocity estimation 210 is able to calculate the velocity of the aircraft in relation to the ground. Velocity estimation 210 then outputs the estimated velocity to be used by other systems on the aircraft. In at least one implementation, the velocity estimation 210 provides the estimated velocity of the aircraft to the Doppler filters 206, wherein the Doppler filters 206 adjust the filters that are used to form the different Doppler beams.

In an alternative implementation, the receiver 200 receives a velocity measurement 212 from an external source. For example, the receiver 200 may receive the velocity measurement 212 from a GPS, a pitot tube, an inertial reference system, or other system or combination of systems capable of providing a velocity measurement 212. The Doppler filters 206 receives the velocity measurement 212 in a similar manner that it would receive the velocity estimation 210 as described above. For example, the receiver 200 adjusts the bandwidth of the Doppler filters 206 based on the magnitude of the velocity measurement 212. For example, if the magnitude of the velocity is half the size of the maximum possible velocity of the aircraft, then the bandwidth of the Doppler filters can be reduced based on the measured velocity.

In certain embodiments, the receiver 200 dynamically controls different Doppler beams to desired positions in frequency where it is expected that the reflected signals at those Doppler frequencies will support sufficiently accurate velocity estimation. For example, over flat terrain, there is little change in range associated with a region that provides zero Doppler offset. As such, the Doppler beam associated with zero Doppler offset provides ambiguous measurements unless there is observable terrain variation. Accordingly, in the case of flat terrain, the Doppler filters may be set to non-zero center frequencies. In at least one implementation, to identify a desired position, the receiver 200 may calculate reflectivity information from the reflected signals and then correlate the data against a map of terrain reflectivity characteristics. Based on the result of the correlation, the receiver 200 may change the frequencies of the different Doppler beams or may apply weighting factors to the measurements acquired through the different Doppler beams.

Figure 3:
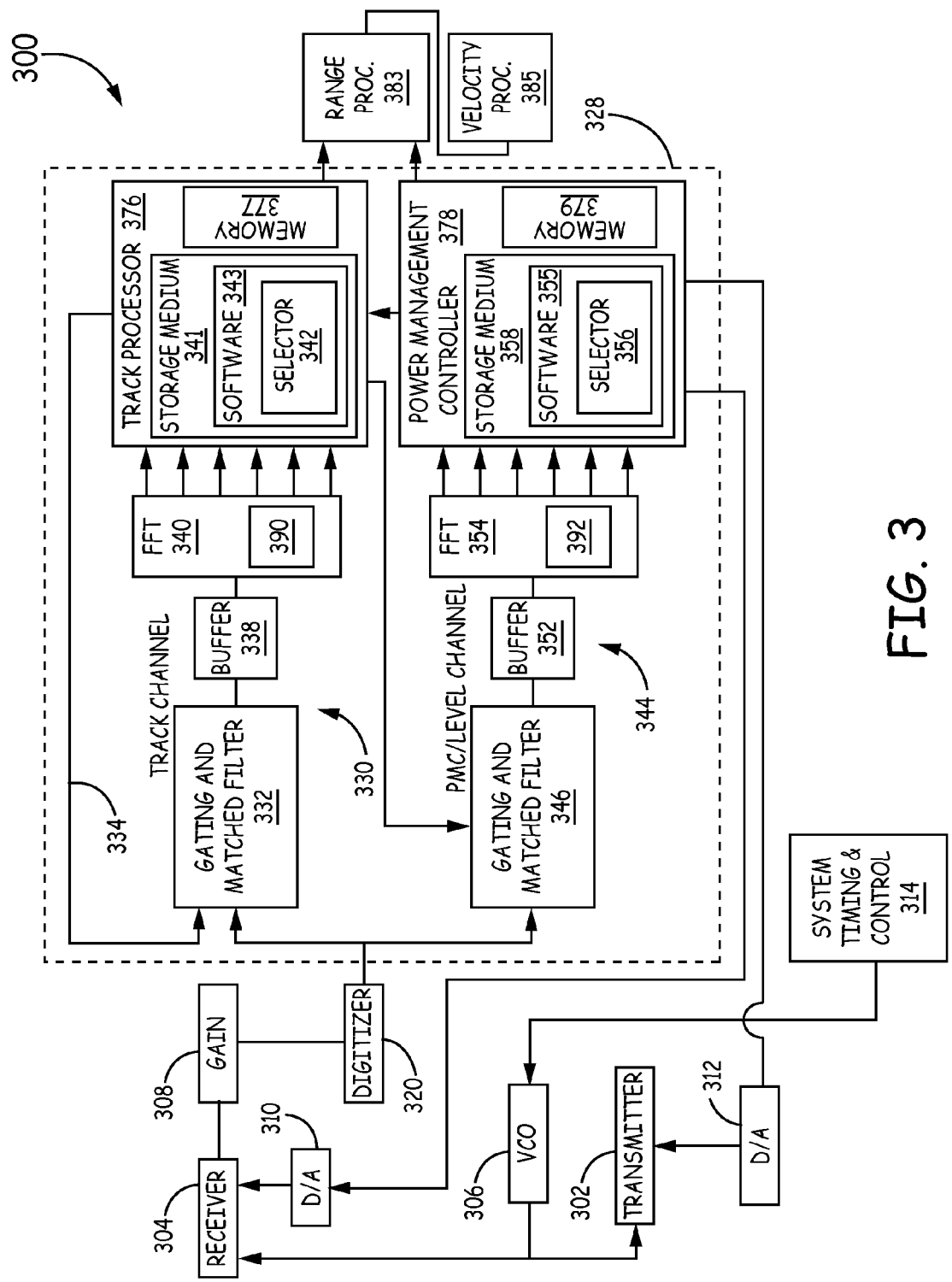
FIG. 3 is a block diagram of a radar altimeter in one embodiment described in the present disclosure.

FIG. 3 is a block diagram of one embodiment of a Doppler beam sharpened radar altimeter system 300. The Doppler beam sharpened radar altimeter system 300 shows a system for forming two separate Doppler beams. However, more Doppler beams may be formed from the received information. The radar altimeter system 300 may be installed on a platform, such as aircraft 150 of FIG. 1. The radar system 300 includes a system timing and control controller 314, a transmitter 302 to transmit radar signals (such as signals 106) and a receiver 304 to receive return signals (such as signals 108). The radar altimeter system 300 also includes a voltage control oscillator (VCO) 306 that provides frequency control for the receiver 304 and the transmitter 302, which is under control of the system timing and control controller 314. A digitizer 320 coupled to the receiver 304 provides for analog to digital conversion. In one embodiment, the receiver 304 converts signals from their transmitted frequency down to an intermediate frequency (IF). Further illustrated in FIG. 3, the radar altimeter system 300 includes digital to analog (D/A) converters 312 and 310 to convert digital signals from a spectral analyzer 328 to the transmitter 302 and the receiver 304, respectively.

The spectral analyzer 328 comprises two or more different processing channels. As shown in this implementation, the spectral analyzer 328 comprises two processing channels. In certain embodiments, the processing channels include a track channel 330 and a PMC channel 344. In one embodiment, the Doppler channels 330 and 344 demodulate intermediate frequency signals from the receiver 304 down to baseband. In other embodiments, receiver 304 demodulates to directly output a baseband signal. Baseband is the minimum frequency that a system operates on. Here, the baseband is 0 Hz. At baseband, the only frequency component of the return signal left is the Doppler shift.

The channels 330 and 344 include gating and matched filter circuits 332 and 346, respectively. Gates are used to select a prescribed time period for a group of measurements of reflected energy. The gating and matched filter circuits 332 and 346 gate the signals from the receiver 304 by selecting a certain time range of samples that will be analyzed by the spectral analyzer 328. Each gate is considered to represent a window of time in which the system monitors the reflected energy (that is, the radar altimeter begins to coherently integrate the signal at the beginning of each gate and stops coherently integrating this signal at the end of each gate). The width of a gate (that is, width in time) is typically set to be equal to the transmit pulse width, but can be longer or shorter. Gate widths may be dependent on the transmit pulse width in that as the transmit pulse width is increased, the track and PMC gate widths are also increased. Gating is not to be confused with windowing. Windowing is discussed below in greater detail. In certain implementations, the gating and matched filter circuits 332 and 346 arrange the samples within respective buffers 338 and 352 according to the range of the returned samples within the prescribed time period. The arrangement of the returned samples is described in greater detail below.

As stated above, in other embodiments, the spectral analyzer 328 may comprise additional Doppler channels. For example, a third channel could function as a level channel with different gate positions or gate widths than the PMC channel 344. A level channel is used to determine if a return signal's level is large enough to be considered a valid target. However, for purposes of this description, the PMC channel 344 functions as a level channel. Also, the different Doppler channels can be used to provide information for the calculation of a velocity estimate by the radar altimeter system 300.

The radar altimeter system 300 also includes a gain circuit 308 placed before the digitizer 320 that controls the gain to provide optimal signal levels to the digitizer 320. In embodiments of the present invention, a gain may also be digital and be placed between the digitizer 320 and the spectral analyzer 328. In alternative embodiments, the channels 330 and 344 each include a gain circuit 308, which may be each assigned different gain values. The channels 330 and 344 in this embodiment include buffers 338 and 352, respectively. The buffers 338 and 352 are memories that store samples of the return signals.

A fast Fourier transform (FFT) 340 separates the return signal 108 into one or more frequency bins. An FFT 354 separates the return signals 108 into one or more frequency bins independent of the FFT 340. The FFTs 340 and 354 are shown separate from the track processor 376 and PMC 378, respectively. However, in other embodiments, the FFT 340 is implemented in software 343 and the FFT 354 is implemented in software 355.

Windowing schemes 390 and 392 are applied with the FFTs 340 and 355, respectively. Windowing is a digital signal processing (DSP) technique typically used to reduce the sensitivity of one FFT bin output compared to signals present in other (usually undesired) FFT bins. Windowing reduces the scalloping loss that occurs when the frequency of a signal of interest lies half-way between the center frequencies of two adjacent bins. Windowing widens the response of each of the FFT frequency bins but does not change their spacing. Different windowing schemes increase the bandwidth of the frequency bins by different amounts with varying effects on any given bin's response to signals outside that bin. Windowing schemes 390 and 392 that can be used include a Hamming window, Hann window, and Blackman window.

Advantages of applying an FFT and a windowing scheme includes that the narrower bandwidth of each frequency bin reduces the detected noise present at the signal acquisition logic. Also, gating the return signal prior to applying the FFTs 340 and 354 reduces processing requirements because the processors 376 and 378, respectively, only have to look at a portion of the return signal In one alternative embodiment, the spectral analyzer 328 includes a bank of band pass filters for separating the return signal into the frequency bins in place of the FFTs 340 and 354. Each individual band pass filter is focused on a different frequency of the Doppler spectrum. These band pass filters may overlap each other in a similar manner as the frequency bins from FFTs 340 and 354.

The signal processing logic of the radar system 100 includes a track processor 376 and a PMC processing unit 378 (also referred to herein as PMC 378). The track processor 376 receives an input from the FFT 340 and from the PMC 378. In certain implementations, the provided inputs comprise an array of signal magnitudes and temporal positions as provided by the respective gating and matched filter circuits 332 and 346 and FFTs 340 and 354. The track processor 376 comprises a memory 377 used for storing a tracking routine and controls the gating and matched filter circuit 332 via a feedback loop 334. Additionally, the track processor 376 provides an output to a range processor 383 and also to the gating and matched filter circuit 346. In one embodiment, the track processor 376 provides separate gate positions and gate widths for both gating and matched filter circuits 332 and 346.

The range processor 383 determines the range based on inputs from the track processor 376 and the PMC 378. In certain implementations, the range processor 383 includes an averager, an altitude adjustment, and a scaling. The averager receives inputs of range measurement or gate positions and smoothes out the gate position movements and the noise inherent in the measurements. In one embodiment of the range processor 383, the averager receives inputs from the track processor 376. The scaling converts the range measurements from units of increments of the gate position to the desired units (typically feet or meters).

The altitude adjustment serves to account for biases in the Doppler beam sharpened radar altimeter 300 that would result in incorrect altitude measurements. In one embodiment of the altitude adjustment, these measurements are compensated for to ensure a zero altitude indication when the platform is at zero feet. Values that can be adjusted to be compensated for include the length of cable between the transmitter 302 and the receiver 304 and their associated antennas, the separation between the transmitter 302 and receiver 304 antennas, the height of the antennas on the aircraft above the ground when stationary, or delays inherent to the receiver 304 or transmitter 302 (such as filter delays, pulse rise times, and the like).

In the embodiment of the radar altimeter 300 illustrated in FIG. 3, the PMC 378 receives the output from FFT 354. The PMC 378 comprises a memory 379 used for storing a power management control routine. The PMC 378 maintains the return signal received at receiver 304 at a sufficient signal strength by controlling the power level of the transmitted signal from the transmitter 302 such that velocity and altitude can be computed reliably. For example, if a return signal is detected above a threshold level, the PMC 378 will instruct the transmitter to transmit the next signal at a lower power level. Keeping the return signal strength below a threshold level decreases the probability of the platform being detected through its emissions. If a return signal is too weak, the PMC 378 instructs the transmitter to transmit at a higher power level (in order for the range gate to continue to track the nearest target) until a new target is detected with a higher power level.

The track processor 376 and the PMC processor 378 perform further signal processing on signals that are within the time period of their gates. Tracking or range measurements are done on the minimum trackable signal within each of the filters or frequency bins. The track processor 376 applies multiple range gates using the gating and matched filter circuit 332 to the return signal to create a complex-valued sample for each gate position for each transmitted pulse as described below in greater detail. The PMC 378 applies a level gate to the return signal using the gating and matched filter circuit 346.

The track channel 330 also comprises a selector 342. The selector 342 selects the frequency bin or filter in the track channel 330 to use for further signal processing. Based on the frequency bin that currently contains the return signal component of interest, the selector 342 passes the signal from the frequency bin to the track processor 376. In the embodiment shown in FIG. 3, the selector 342 is implemented in the software 343 that is executed by the track processor 376. The software 343 comprises program instructions that are stored on a suitable storage device or medium 341. Typically, a portion of the software 343 executed by the track processor 376 and one or more data structures used by the software 343 during execution are stored in a memory 377. Similarly, the PMC channel 344 also comprises a selector 356 for selecting the frequency bin or filter to use for further signal processing. The selector 356 is implemented in software 355 stored on a storage medium 358. Typically, a portion of the software 355 executed by the PMC 378 and one or more data structures used by the software 355 during execution are stored in a memory 379.

The frequency bin (or filter, for the embodiment of a bank of filters) can be selected based on any defining characteristic of a portion of the pulse having a frequency corresponding to that frequency bin. The selector 342 is in the track channel 330 and thus selects the frequency bin which contains the defining characteristic of the signal. In one embodiment, a defining characteristic is a portion of the pulse that corresponds to the nearest range after Doppler filtering. The range processor tracks the pulse corresponding to the nearest target, and the selector 342 selects the frequency bin which the characteristic of the pulse corresponding to the nearest range falls into. The track channel 330 operates to track the nearest target by enabling the selector 342 to pick the bin with the largest signal level at the current gate position and use that signal level to compare to a track threshold to determine if the gate position needs to be increased or reduced. The track threshold is a signal level that outputs a signal that can be directly computed into a range corresponding to the actual distance to the target when the range gate is in position.

Similarly, in one embodiment, the PMC selector 356 selects the frequency bin in which the pulse with the strongest signal falls into. In another embodiment, the same bin chosen by the track channel 330 is then used by the PMC channel 344 to control the transmit power to maintain the signal return level at a designed threshold or reference level. In this embodiment, the PMC channel 344 does not just pick the maximum signal level from the FFT 354 (or, in another embodiment, the bank of band pass filters) to determine which frequency bin to operate on but instead operates on the bin selected by the track channel 330 selector 342.

In at least one implementation, the range processor 383 and spectral analyzer 328 pass the range and frequency data associated with the multiple Doppler beams to a velocity processor 385. The velocity processor 385 uses the range and frequency data to calculate the velocity of the aircraft as described in greater detail within this specification. In at least one implementation, the velocity processor 385 provides a velocity estimate to the spectral analyzer 328, where the spectral analyzer 328 uses the velocity estimate to adjust the frequency range of the Doppler spectrum.

Various aspects of the Doppler beam sharpened radar altimeter 300 (for example, but not limited to, the gating and matched filter circuits 332 and 346, the gain 308, the digitizer 320, the selectors 342 and 356, and the FFTs 340 and 354) can be implemented using integrated or discrete electronic components, and combinations thereof, as known to one of ordinary skill in the art.

Figure 4:
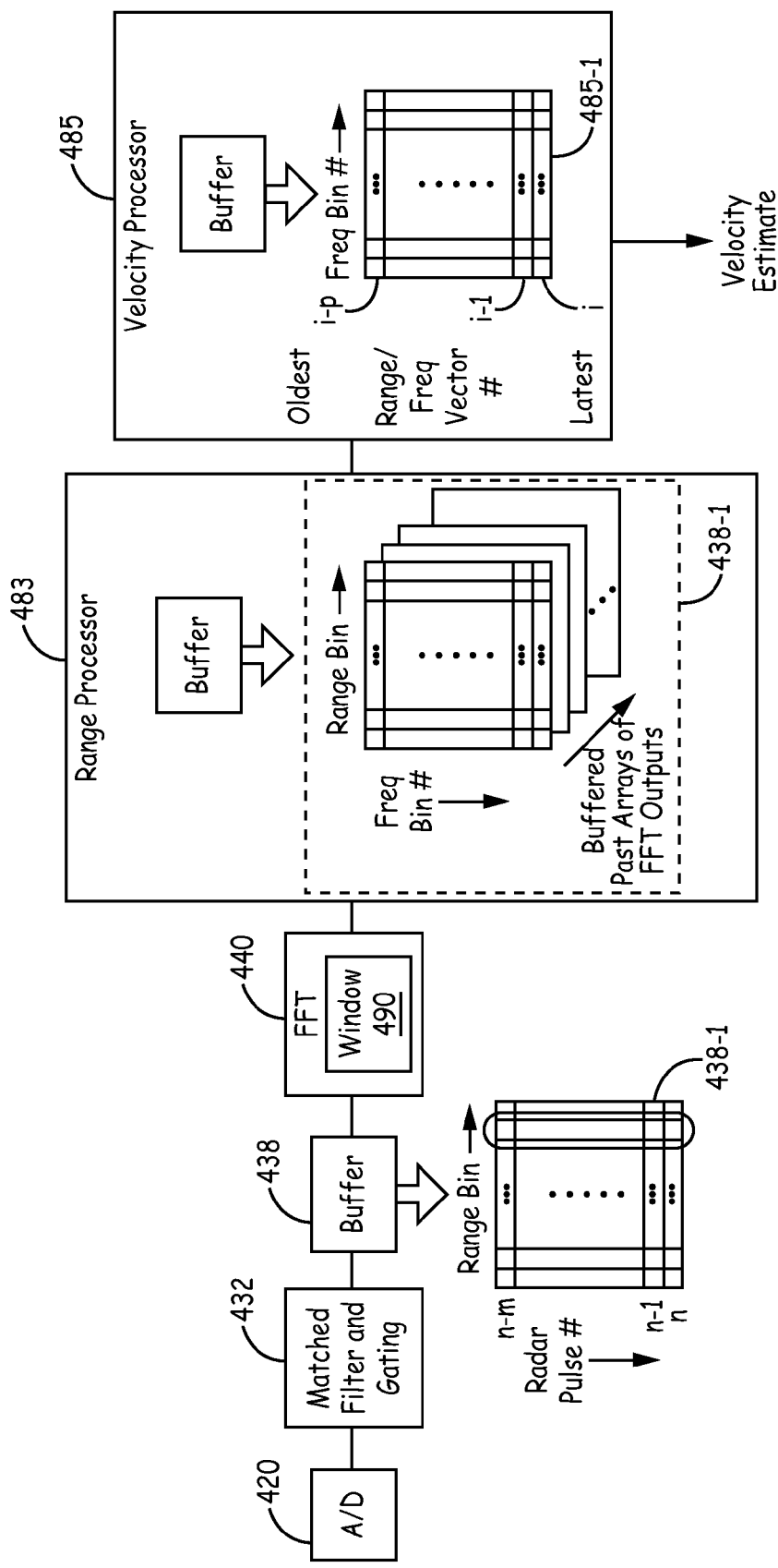
FIG. 4 is a block diagram of a channel within a radar altimeter for estimating velocity in one embodiment described in the present disclosure.

FIG. 4 is a block diagram illustrating the calculation of a velocity estimate performed by the track channel. As illustrated, FIG. 4 shows an A/D converter 420. In at least one implementation, the A/D converter 420 functions in a similar manner to digitizer 320 in FIG. 3. For example, the A/D converter 420 receives a downconverted and amplified analog reflected radar signal and converts the signal to a digital signal for subsequent processing. The A/D converter 420 then passes the signal to matched filter and gating 432. Matched filter and gating 432 functions similarly as described above with respect to gating and matched filter 332. For example, the matched filtering and gating 432 gate time periods of signals for storage in a buffer 438. For example, the buffer 438 stores an array 438-1 that comprises of indexed rows of signals received during a time period. Further, the matched filtering performed by matched filtering and gating 432 filters the signals received within each gate, typically, a simple coherent integration to form a complex-valued sample for each gate position. Accordingly, the row is arranged as a series of complex-valued samples, one sample for each gate position or range bin. In certain implementations, the above description applies to a pulsed systems and may also apply to frequency modulated continuous wave (FMCW) techniques or other modulation techniques that allow the formation of complex-valued samples at each range-bin.

When a series of gated radar measurements are stored in the array 438 for multiple radar pulses, data from different radar pulses for a particular range bin are scaled through window 490 and transformed by FFT 440. Both FFT 440 and window 490 function similarly to FFT 340 and window 390 described above with respect to FIG. 3. When the data in array 438-1 is windowed and transformed, the transformed data for multiple arrays 438-1 is stored in array 483-1. The array 483-1 includes multiple arrays, where each array includes rows of range bins and each row of range bins corresponds to a different frequency bin. Where the initial frequency bins correspond to negative Doppler frequency offsets and the later frequency bins correspond to positive Doppler frequency offsets. From the array 483-1, the range processor is able to calculate the range to the terrain for each frequency bin at the time the data for the particular two-dimensional array was received. The processed range data is then provided to the velocity processor 485.

In certain implementations, the velocity processor 485 stores the data in an array 485-1. The array 485-1 stores data that is in a lower indexed row as older data and data in a higher indexed row as more recently received data. Each column corresponds to a different Doppler frequency shift, the different frequency shifts being arranged from negative Doppler frequency shifts to positive frequency shifts. The data in the rows corresponds to range per frequency vector and is used by the velocity processor 485 to provide a velocity estimation.

In at least one embodiment, the velocity processor 485 provides an initial velocity estimate during an initial velocity acquisition. When a device using the velocity processor 485 either turns on or has yet to acquire data capable of providing a reliable velocity estimate, the device may enter a velocity acquisition mode. In the velocity acquisition mode, the device may attempt to get an initial approximate estimate of velocity from which the device can calculate more accurate estimations of velocity. In one exemplary implementation, the velocity processor 485 may identify the maximum observed Doppler shift in the data stored in array 485-1. The maximum observed Doppler shift may be either the maximum or minimum frequency bins in which a detectable signal (above the noise floor) is present. The maximum observed Doppler shift may then be used to compute a coarse estimate of velocity.

Further, the velocity processor 485 may provide continuous velocity estimate updates, where a continuous velocity estimate is an estimate provided during the normal operation of the device. To provide continuous velocity estimates, the velocity processor computes a range of frequency bins for negative and positive Doppler shift based on the current estimated velocity. In one implementation, the current estimated velocity may come from other sources of velocity, such as a GPS, an INS, and the like. Alternatively, the velocity processor may use the most recent velocity estimate as the current estimated velocity. The velocity processor then may identify a range of test velocities (denoted as set V) that encompass the estimated velocity. The velocity processor then may identify a time delta (T) over which the velocity is not expected to change significantly. The selection of duration for the time delta T may be application specific. A smaller time delta T may provide faster tracking of velocity but may also result in noisier velocity estimates.

To calculate the current velocity, the velocity processor 485 uses the range measurements at one or more frequency bins (designated as set A) from the most recent vector of range estimates. As stated above, the most recent vector of range estimates corresponds to the bottom row of array 485-1. For the set A of range measurements, the velocity processor 485 estimates the expected Doppler frequency offsets for a velocity V1 (where V1 is a velocity in the set of test velocities V) at a time T in the past. The velocity processor 485 may then interpolate the range values from the range array given T and the expected Doppler frequency offsets. The resulting interpolated set of range values may be designated as set B. When set B is calculated, the velocity processor 485 may subtract set B from A to compute the total magnitude of the error for the test velocity V1. The magnitude of error may be computed as a root mean square of the elements of set B—set A. The magnitude of error for V1 provides an estimate of how close the test velocity matches the true velocity. The velocity processor 485 uses the above procedure to calculate the magnitudes of errors for each velocity in the range of test velocities V. The velocity processor 485 computes a velocity estimate based on the resulting set of error magnitudes for the test velocities. In at least one implementation, the test velocity having the smallest estimated error magnitude is reported as the velocity. In other implementations, the test velocities in the neighborhood of the test velocity having the smallest estimated error magnitude and the associated estimated error magnitudes are interpolated to identify a velocity estimate between the test velocities in the set of test velocities. Interpolation may be performed using any form of interpolation known to one having skill in the art, for example interpolation may be performed using conic interpolation, Hermite interpolation, splines, or the like.

Figure 5:
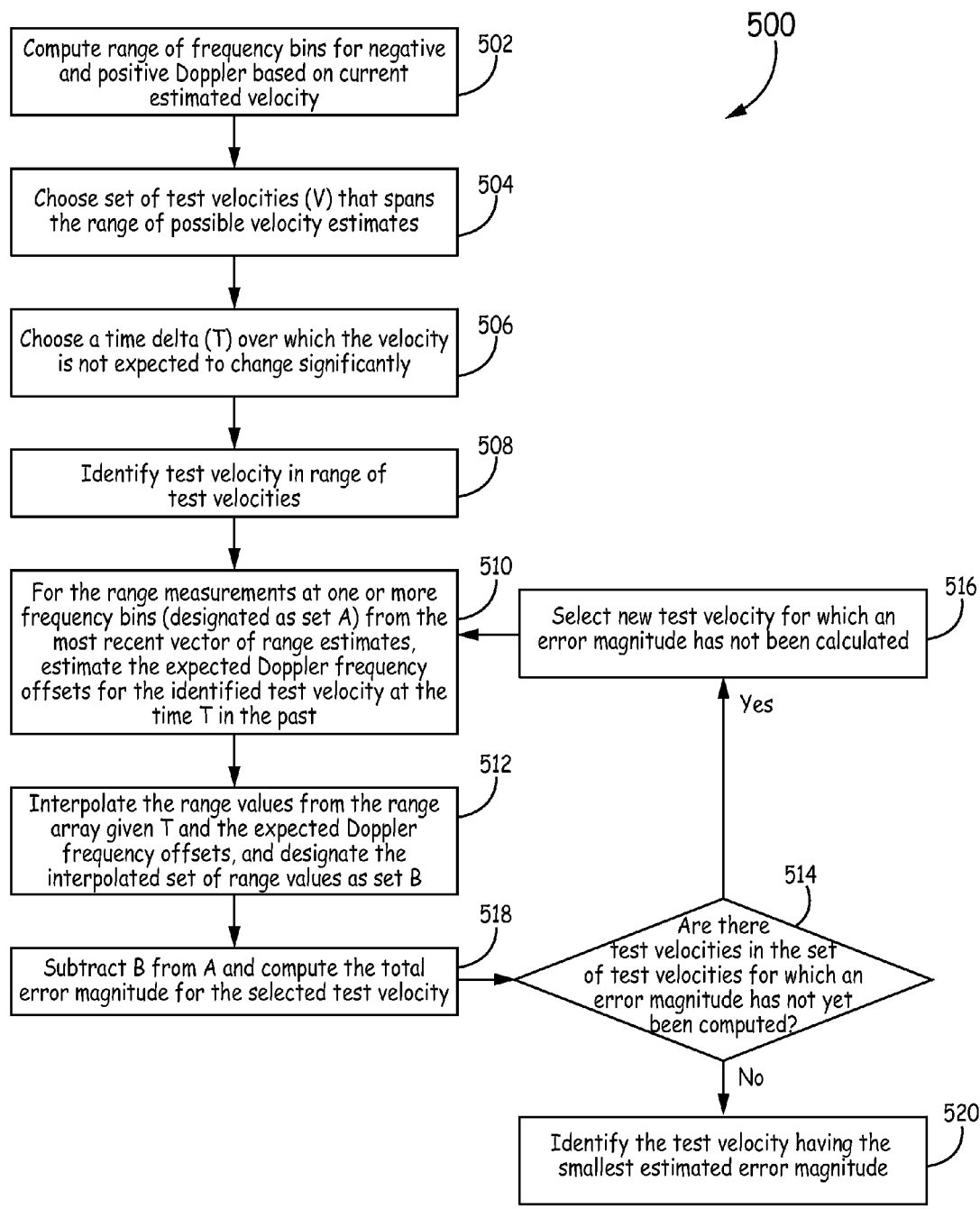
FIG. 5 is a flow diagram of a method for providing a velocity estimate in one embodiment described in the present disclosure.

FIG. 5 illustrates a flow diagram for a method 500 for estimating a velocity. Method 500 proceeds at 502, where a range of frequency bins is computed for negative and positive Doppler based on current estimated velocity. Method 500 proceeds at 504, where a set of test velocities (V) is chosen that spans the range of possible velocity estimates. Method 500 then proceeds at 506, where a time delta (T) is chosen over which the velocity is not expected to change significantly. Method 500 then proceeds at 508, where a test velocity is identified in the range of test velocities.

Further, Method 500 proceeds at 510, where, for the range measurements at one or more frequency bins (designated as set A) from the most recent vector of range estimates, an expected Doppler frequency offset is estimated for the identified test velocity at the time T in the past. Method 500 then proceeds at 512, where the range values are interpolated from the range array given T and the expected Doppler frequency offsets, and the interpolated set of range values are designated as set B. Method 500 proceeds at 518, where set B is subtracted from set A and the total error magnitude for the selected test velocity is computed. Method 500 proceeds at 514, where it is determined whether there are test velocities in the set of test velocities for which an error magnitude has not yet been computed. In some implementations, the set of test velocities defines a range of test velocities. If there are test velocities remaining, method 500 proceeds to 516, where a new test velocity is selected for which an error magnitude has not been calculated. With the new selected test velocity, the method 500 returns to 510. If there are no test velocities remaining, method 500 proceeds to 520, where the test velocity having the smallest estimated error magnitude is identified. In at least one implementation, the test velocity having the smallest estimated error magnitude is reported as the velocity. In other implementations, the test velocities in the neighborhood of the test velocity having the smallest estimated error magnitude and the associated estimated error magnitudes are interpolated to identify a velocity estimate between the test velocities in the set of test velocities.

Figure 6:
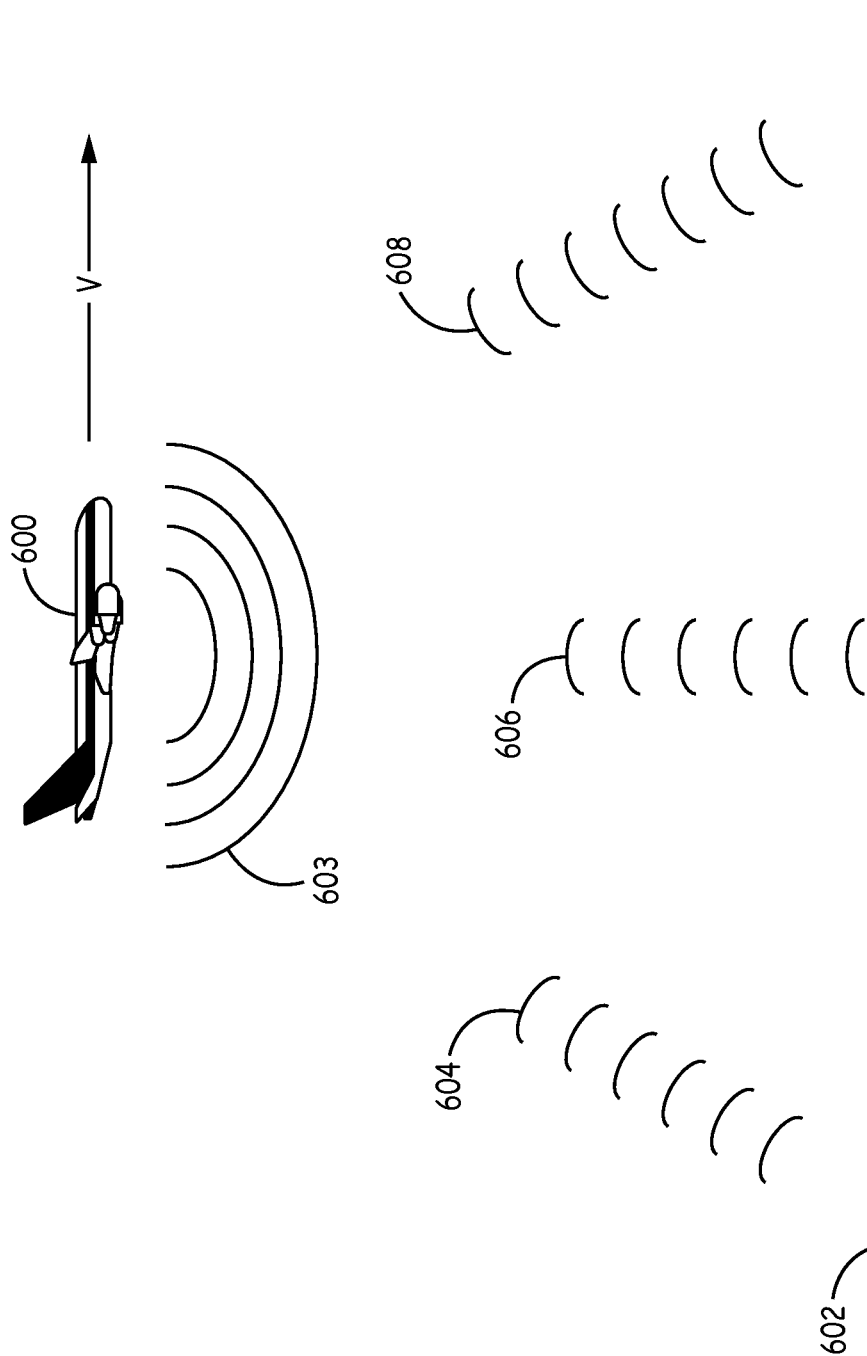
FIG. 6 is a diagram illustrating an aircraft equipped with a radar altimeter that measures velocity over level ground in one embodiment described in the present disclosure.

FIG. 6 is a drawing of an aircraft 600 that has a radar altimeter configured to measure a velocity V of the aircraft 600 as it travels parallel to a flat surface 602, according to one embodiment. As shown, the radar altimeter transmits a single radar beam 603 and receives three different Doppler shifted beams, while three different Doppler shifted beams are shown, the radar altimeter may receive any number of Doppler shifted beams. In particular, the radar altimeter transmits beam 603 and receives a first Doppler shifted beam 604, a second Doppler shifted beam 606, and a third Doppler shifted beam 608. By gathering the data from the three separate Doppler shifted beams, the radar altimeter on the aircraft 600 is able to calculate the velocity V of the aircraft 600.

In at least one implementation, to calculate the velocity V of the aircraft, the radar altimeter transmits beam 603 and receives the first Doppler shifted beam 604. As the aircraft 600 is moving away from portions of the surface 602, when the first beam 604 reflects off of the surface 602 and is received by the radar altimeter on the aircraft 600 that is travelling away from the surface that reflected the first beam 604, the frequency of the received first beam 604 will be less than the frequency of the transmitted beam 603. From the received first beam 604, the radar altimeter will also be able to calculate the range of the aircraft to the point on the surface 602 that reflected the first beam 604 back towards the aircraft 600.

In a similar manner, the radar altimeter transmits the beam 603 and receives the third beam 608. However, as the aircraft 600 is moving towards portions of the surface 602, when the third beam 608 reflects off of the surface 602 and is received by the radar altimeter on the aircraft 600 that is travelling towards the surface 602, the frequency of the received third beam 608 will be greater than the frequency of the transmitted beam 602. From the received third beam 608, the radar altimeter will also be able to calculate the range of the aircraft to the point on the surface 602 that reflected the third beam 608 back towards the aircraft 600.

Further, the radar altimeter transmits the beam 603 and receives the second beam 606. In contrast to the first beam 604 and the third beam 608, the second beam 606 is reflected by the ground 602 that is directly beneath the aircraft 600. As the aircraft 600 is flying parallel to the surface 602, the aircraft is not moving towards the surface 602. Thus, the second beam 606 is received at the same frequency as the transmitted beam 603. From the second beam 606, the radar altimeter is able to calculate the range from the aircraft to the surface 602.

In certain embodiments, to calculate the velocity V, the radar altimeter uses information from at least two Doppler beams. For example, the radar altimeter may calculate the velocity of the aircraft 600 using a combination of the first beam 604, the second beam 606, and the third beam 608. The radar altimeter on the aircraft 600 has already calculated the range of the ground associated with each beam. Also, the radar altimeter has also calculated the Doppler shift associated with each beam. With this information, the radar altimeter is able to calculate the velocity of the aircraft as described above in relation to FIGS. 4 and 5.

In at least one implementation, the radar altimeter is able to compare the signal power of the received beams at the different Doppler shifts with the signal power of the transmitted signal. By comparing the power levels of the different signals, the radar altimeter is able to determine the reflectivity of the surfaces that reflect the transmitted signals. Based on the sensed reflectivity, the receiver may adjust the frequencies of the Doppler beams, such that the Doppler beams are associated with surfaces having higher reflectivity, such that the received signals are more likely to provide accurate measurements. Also, the radar altimeter may correlate the reflectivity with data from a map describing the reflectivity of the different surfaces on the Earth. By correlating the reflectivity measurement with reflectivity information from a map, the radar altimeter may be able to adjust the Doppler beams to point at regions on the Earth's surface having desirable reflectivity. In at least one implementation, the radar altimeter weighs the measurements based on the reflectivity of the different radar beams when calculating the velocity. For example, if there are more than two Doppler beams, the radar altimeter may apply weights such that the radar altimeter relies on measurements from beams having higher reflectivity than beams having lower reflectivity.

Figure 7:
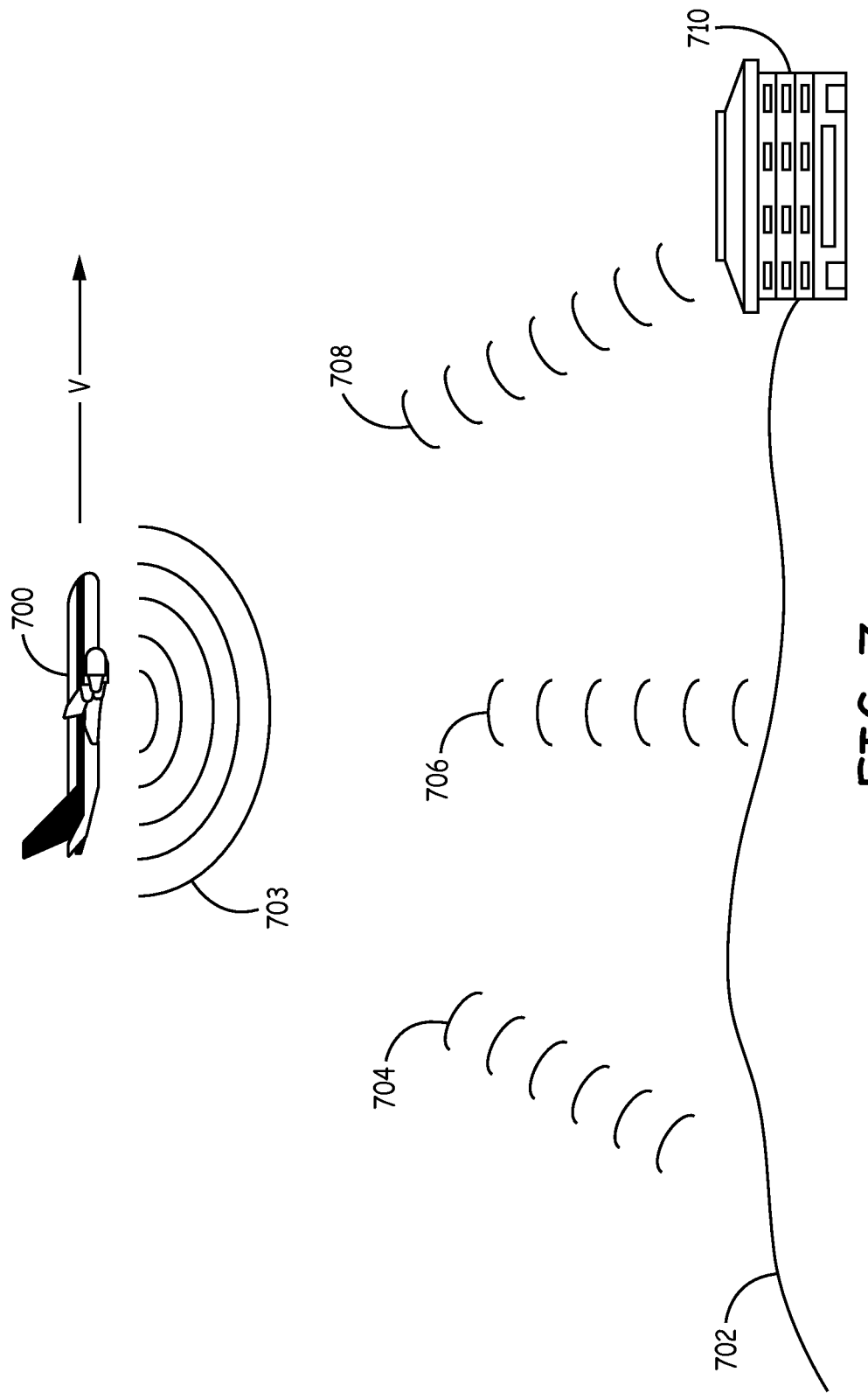
FIG. 7 is a diagram illustrating an aircraft equipped with a radar altimeter that measures velocity over uneven ground in one embodiment described in the present disclosure.

FIG. 7 is a drawing of an aircraft 700 that has a radar altimeter configured to measure a velocity V of the aircraft 700 as it travels over a surface 702, where the surface varies in elevation, according to one embodiment. As shown, the radar altimeter receives three different Doppler beams, while three different Doppler beams are shown, the radar altimeter may receive other numbers of Doppler beams. In the particular example, the radar altimeter transmits beam 703 and receives a first beam 704, a second beam 706, and a third beam 708. By gathering the data from the three separately received beams, the radar altimeter on the aircraft 700 is able to calculate the velocity V of the aircraft. However, in contrast to the example provided above with respect to FIG. 4, the surface 702 varies in elevation such that the range measurements provided by the different Doppler beams are associated with sections of the surface 702 that have different elevations. To determine the magnitude of the velocity vector V, the radar altimeter may make several measurements over a period of time, such that the different Doppler beams are reflected from the same portions of surface 702.

In certain embodiments, the radar altimeter receives the third beam 708. At a particular moment in time, the third beam 708 reflects off of surface feature 710. Surface feature 710 is any identifiable feature on the surface 702. For example, the feature 710 may include a building, a mountain, a hill, a valley, and the like. Further, as the aircraft 700 is moving towards the waves reflected as part of the third beam 708, when the third beam 708 reflects off of the ground and is received by the radar altimeter on the aircraft 700 that is travelling towards the third beam 708, the frequency of the received third beam 708 will be greater than the frequency of the transmitted beam 703. From the received third beam 708, the radar altimeter will also be able to calculate the range of the aircraft to the point on the ground that reflected the third beam 708 back towards the aircraft 700.

As the aircraft 700 continues to travel, the surface feature 710 may be positioned directly below the area scanned by the second beam 706. As the surface feature 710 is directly below, the radar altimeter receives measurements associated with the surface feature 710 that can be compared against the measurements of the surface feature 710 acquired by the third beam 708. Further, at a slightly later moment in time, the first beam 704 may acquire measurements of the surface feature 710, which measurements acquired by the first beam 704 of the surface feature 710 may also be compared to the measurements of the surface feature 710 acquired by the third beam 708 and the second beam 706.

In certain embodiments, to determine that a surface feature measured by the third beam 708 at one time is the same surface feature measured by the second beam 706 and the first beam 704 at different times, the radar altimeter monitors sequences of ranges measured by the different Doppler beams to identify the surface feature 710. For example, the radar altimeter on the aircraft 700 may correlate different sequences of range measurements associated with the different Doppler ranges over a period of time. Alternatively, the radar altimeter may perform curve fitting to identify the different sequences of range measurements by different Doppler beams that are associated with the same surface. By correlating the sequences of range measurements from the different Doppler beams or by performing curve fitting, the radar altimeter is able to identify range measurements of a single surface feature 710 by the different Doppler beams.

In certain embodiments, having acquired different measurements of the surface feature 710 by the multiple Doppler beams, the radar altimeter calculates the magnitude of the velocity vector V. To calculate the velocity magnitude, the radar altimeter uses corresponding measurements of the surface feature 710 from at least two Doppler beams. For example, the radar altimeter may calculate the velocity of the aircraft 700 using any combination of measurements of the surface feature 710 from the first beam 704, the second beam 706, and the third beam 708.

Figure 8:
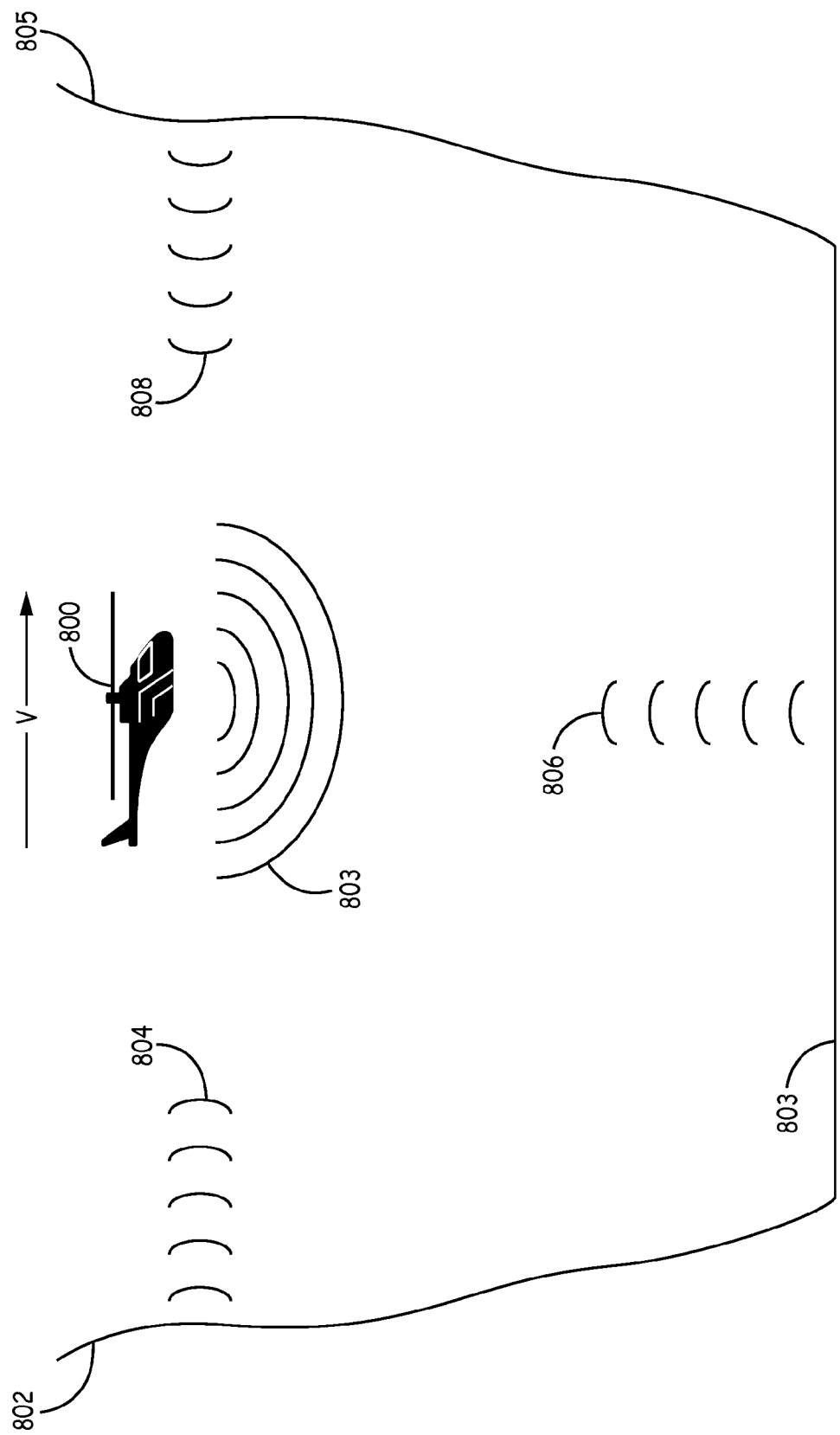
FIG. 8 is a diagram illustrating an aircraft equipped with a radar altimeter that determines the maximum and minimum expected Doppler shift in one embodiment described in the present disclosure.
Figure 9:
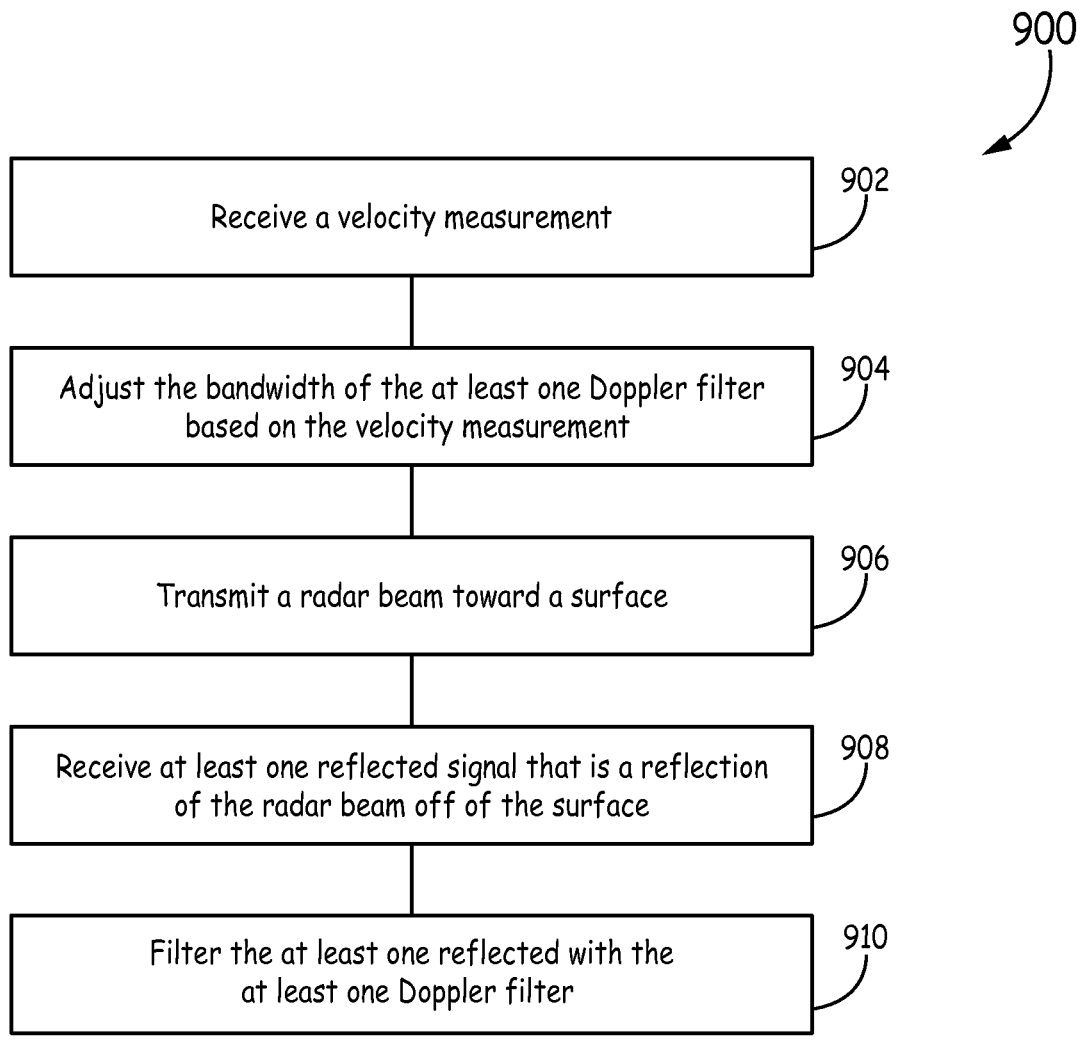
FIG. 9 is a flow diagram of a method for calculating velocity using a radar altimeter in one embodiment described in the present disclosure.

FIG. 8 is a diagram of an aircraft 800 having a radar altimeter that emits Doppler beams configured to measure the full range of Doppler shifts as determined by the velocity of the aircraft 800. As shown, the radar altimeter on the aircraft 800 transmits and receives three Doppler beams, a first Doppler beam 804, a second Doppler beam 806, and a third Doppler beam 808. The first Doppler beam 804 is received from a direction that is opposite to the direction of the velocity vector V. Thus, the measured frequency of the received first beam 804 will be at the minimum expected frequency for a Doppler shifted signal as the aircraft 800 is moving directly away from the surface 802 that reflected the first Doppler beam 804. However, the third Doppler beam 808 is received from the same direction as the velocity vector V of the aircraft 800 towards surface 805. As the aircraft 800 is moving directly to the surface 805 that reflects the third Doppler beam 808, the measured frequency of the received third beam 808 will be at the maximum expected frequency for a Doppler shifted signal. In contrast to the first Doppler beam 804 and the third Doppler beam 808, the radar altimeter receives the second Doppler beam 806 from a direction perpendicular to the velocity vector V of the aircraft 800. Thus, the received second Doppler beam 806 will have the same measured frequency as the transmitted beam 803.

In certain embodiments, the velocity vector V determines the maximum and minimum expected Doppler shifts for reflected signals. In certain implementations, the radar altimeter implements Doppler filters to acquire the needed information from the different Doppler Beams. As the maximum and minimum expected Doppler shifts are tied to the velocity of the aircraft 800, the radar altimeter may adjust the characteristics such as center frequency and bandwidth of the different Doppler filters based on the calculated velocity provided by the measurements of the different Doppler beams. Alternatively, the radar altimeter may adjust the characteristics of the different Doppler filters based on a velocity measurement provided by an external source of velocity information. For example, the radar altimeter may receive velocity information from a global positioning system receiver, an inertial navigation system, a pitot tube, and the like.

FIG. 8 is a flow diagram of a method 800 for adjusting bandwidth for at least one Doppler filter in a Doppler beam sharpened radar altimeter. Method 800 proceeds at block 802, where a velocity measurement is received. For example, the radar altimeter receives a velocity measurement from a GPS receiver. Alternatively, the radar altimeter calculates the velocity based on measurement differences between different Doppler beams as discussed above. Further, method 800 proceeds at block 804, where the bandwidth of the at least one Doppler filter is adjusted based on the velocity measurement. For example, the bandwidth of the Doppler filters is designed to be able to filter the possible frequencies of the reflected signals. As the possible frequencies depend on the velocity of the aircraft, the bandwidth is adjusted based on the velocity of the aircraft.

Method 800 proceeds at block 806, where at least one radar beam is transmitted. For example, a radar emits a radar beam towards a surface over which an aircraft is traveling. The radar beam propagates towards the surface and reflects off of the surface. Method 800 then proceeds at block 808, where at least one reflected signal is received, where the signal is a reflection of the radar beam off of the surface. For example, each reflection of the transmitted beam from a different location will exhibit different Doppler shift due to the relative velocities between the aircraft and the location. Due to this difference in velocity towards the different locations, each reflected radar beam will be received at a different Doppler frequency. In a further implementation, method 800 proceeds at 810, where the at least one reflected radar beam is filtered with the at least one Doppler filter. As signals are received at different Doppler frequencies, the Doppler filters can be used to isolate signals associated with a particular location. When the signals associated with a particular location are isolated, the range towards the particular location can be determined.

EXAMPLE EMBODIMENTS

Example 1 includes a method for adjusting bandwidth for at least one Doppler filter in a Doppler beam sharpened radar altimeter, the method comprising: receiving a velocity measurement; adjusting the bandwidth of the at least one Doppler filter based on the velocity measurement; transmitting a radar beam, wherein the radar beam is aimed toward a surface; receiving at least one reflected signal, wherein the at least one reflected signal is a reflection of the radar beam being reflected off of at least one portion of the surface; and filtering the at least one reflected signal with the at least one Doppler filter to form at least one Doppler beam.

Example 2 includes the method of Example 1, wherein the velocity measurement is received from a source external to the Doppler beam sharpened radar altimeter.

Example 3 includes the method of Example 2, wherein the source is at least one of: an inertial reference system; a global positioning system receiver; or a pitot tube.

Example 4 includes the method of any of Examples 1-3, wherein the Doppler beam sharpened radar altimeter produces the velocity measurement.

Example 5 includes the method of Example 4, further comprising: receiving a plurality of reflected signals, wherein the plurality of reflected signals correspond to portions of the transmitted radar beam that are reflected by a plurality of portions of the surface; identifying a set of test velocities; for each velocity in the set of test velocities, calculating a magnitude of errors based on range measurements associated with the at least one Doppler beam; and identifying a velocity in the set of test velocities associated with the smallest magnitude of errors as the velocity magnitude.

Example 6 includes the method of Example 5, further comprising: applying weighting factors to the Doppler offsets associated with the at least one Doppler beam.

Example 7 includes the method of any of Examples 1-6, further comprising dynamically adjusting the frequency of a desired Doppler shift based on an expected location on the surface that will produce an improved range measurement.

Example 8 includes the method of Example 7, further comprising determining the expected location based on terrain reflectivity information collected from the at least two reflected radar beams, wherein the terrain reflectivity information is correlated against a map of terrain reflectivity characteristics.

Example 9 includes a system for measuring aircraft altitude, the system comprising: a transmitter that transmits a signal towards a surface; a receiver that receives at least one reflected signal where the at least one reflected signal is reflected by a surface; and a processor that determines the bandwidth of at least one Doppler filter based on a velocity measurement, wherein the processor uses the at least one Doppler filter to filter the at least one reflected signal to form at least one Doppler beam and calculate a range between the aircraft and the surface by comparing when the at least one reflected signal was received in relation to when the signal was transmitted.

Example 10 includes the system of Example 9, wherein the velocity measurement is received from a source external to the system.

Example 11 includes the system of Example 10, wherein the source is at least one of: an inertial reference system; a global positioning system receiver; o a pitot tube.

Example 12 includes the system of any of Examples 9-11, wherein the system produces the velocity measurement.

Example 13 includes the system of Example 12, wherein the processor determines Doppler offsets for a plurality of reflected signals in the at least one reflected signal for a plurality of different frequencies, wherein the processor determines the velocity measurement for the aircraft based on range measurements from the plurality of reflected signals.

Example 14 includes the system of Example 13, wherein the processor determines the velocity measurement by: identifying a set of test velocities; for each velocity in the set of test velocities, calculating a magnitude of errors based on range measurements associated with the at least one Doppler beam; and identifying a velocity within a range of test velocities associated with the smallest magnitude of errors as the velocity measurement.

Example 15 includes the system of any of Examples 13-14, wherein the processor applies weighting factors to the Doppler offsets associated with the at least two reflected signals.

Example 16 includes the system of any of Examples 13-15, wherein the processor determines the expected location based on terrain reflectivity information collected from the at least two reflected signals, wherein the terrain reflectivity information is correlated against a map of terrain reflectivity characteristics.

Example 17 includes a radar altimeter receiver, the receiver comprising: an analog to digital converter configured to convert at least one received analog signal into at least one digital signal, where the at least one received analog signal was reflected off a surface; at least one Doppler filter configured to filter the at least one digital signal to produce at least one filter signal, wherein the bandwidth of the at least one Doppler filter is adjusted based on the velocity of a vehicle carrying the radar altimeter receiver; and a range measurer configured to calculate a range between the radar altimeter receiver and the surface based on the at least one signals.

Example 18 includes the radar altimeter receiver of Example 17, further comprising a velocity estimator configured to calculate the velocity of a vehicle containing the radar altimeter receiver based on the range measurements and different calculated Doppler shifts for the at least one digital signal.

Example 19 includes the radar altimeter receiver of any of Examples 17-18, further comprising at least one gate, wherein a gate in the at least one gate selects time range of samples from the digital signals for filtering by the at least one Doppler filter.

Example 20 includes the radar altimeter receiver of any of Examples 17-19, wherein the velocity is received from a source external to the radar altimeter receiver.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof

What is claimed is:

1. A method for adjusting bandwidth for at least one Doppler filter in a Doppler beam sharpened radar altimeter, the method comprising:
   receiving a velocity measurement;
   adjusting the bandwidth of the at least one Doppler filter based on the velocity measurement;
   transmitting a radar beam, wherein the radar beam is aimed toward a surface;
   receiving at least one reflected signal, wherein the at least one reflected signal is a reflection of the radar beam being reflected off of at least one portion of the surface; and
   filtering the at least one reflected signal with the at least one Doppler filter to form at least one Doppler beam.

2. The method of claim 1, wherein the velocity measurement is received from a source external to the Doppler beam sharpened radar altimeter.

3. The method of claim 2, wherein the source is at least one of:
   an inertial reference system;
   a global positioning system receiver; or
   a pitot tube.

4. The method of claim 1, wherein the Doppler beam sharpened radar altimeter produces the velocity measurement.

5. The method of claim 4, further comprising:
   receiving a plurality of reflected signals, wherein the plurality of reflected signals correspond to portions of the transmitted radar beam that are reflected by a plurality of portions of the surface;
   identifying a set of test velocities;
   for each velocity in the set of test velocities, calculating a magnitude of errors based on range measurements associated with the at least one Doppler beam; and
   identifying a velocity in the set of test velocities associated with the smallest magnitude of errors as the velocity magnitude.

6. The method of claim 5, further comprising:
applying weighting factors to the Doppler offsets associated with the at least one Doppler beam.

7. The method of claim 1, further comprising dynamically adjusting the frequency of a desired Doppler shift based on an expected location on the surface that will produce an improved range measurement.

8. The method of claim 7, further comprising determining the expected location based on terrain reflectivity information collected from the at least two reflected radar beams, wherein the terrain reflectivity information is correlated against a map of terrain reflectivity characteristics.

9. A system for measuring aircraft altitude, the system comprising:
a transmitter that transmits a signal towards a surface;
a receiver that receives at least one reflected signal where the at least one reflected signal is reflected by a surface; and
a processor that determines the bandwidth of at least one Doppler filter based on a velocity measurement, wherein the processor uses the at least one Doppler filter to filter the at least one reflected signal to form at least one Doppler beam and calculate a range between the aircraft and the surface by comparing when the at least one reflected signal was received in relation to when the signal was transmitted.

10. The system of claim 9, wherein the velocity measurement is received from a source external to the system.

11. The system of claim 10, wherein the source is at least one of:
an inertial reference system;
a global positioning system receiver; or
a pitot tube.

12. The system of claim 9, wherein the system produces the velocity measurement.

13. The system of claim 12, wherein the processor determines Doppler offsets for a plurality of reflected signals in the at least one reflected signal for a plurality of different frequencies, wherein the processor determines the velocity measurement for the aircraft based on range measurements from the plurality of reflected signals.

14. The system of claim 13, wherein the processor determines the velocity measurement by:
identifying a set of test velocities;
for each velocity in the set of test velocities, calculating a magnitude of errors based on range measurements associated with the at least one Doppler beam; and
identifying a velocity within a range of test velocities associated with the smallest magnitude of errors as the velocity measurement.

15. The system of claim 13, wherein the processor applies weighting factors to the Doppler offsets associated with the at least two reflected signals.

16. The system of claim 13, wherein the processor determines the expected location based on terrain reflectivity information collected from the at least two reflected signals, wherein the terrain reflectivity information is correlated against a map of terrain reflectivity characteristics.

17. A radar altimeter receiver, the receiver comprising:
an analog to digital converter configured to convert at least one received analog signal into at least one digital signal, where the at least one received analog signal was reflected off a surface;
at least one Doppler filter configured to filter the at least one digital signal to produce at least one filter signal, wherein the bandwidth of the at least one Doppler filter is adjusted based on the velocity of a vehicle carrying the radar altimeter receiver; and
a range measurer configured to calculate a range between the radar altimeter receiver and the surface based on the at least one signals.

18. The radar altimeter receiver of claim 17, further comprising a velocity estimator configured to calculate the velocity of a vehicle containing the radar altimeter receiver based on the range measurements and different calculated Doppler shifts for the at least one digital signal.

19. The radar altimeter receiver of claim 17, further comprising at least one gate, wherein a gate in the at least one gate selects time range of samples from the digital signals for filtering by the at least one Doppler filter.

20. The radar altimeter receiver of claim 17, wherein the velocity is received from a source external to the radar altimeter receiver.

* * * * *